United States Patent
Motoyoshi

(10) Patent No.: US 8,718,712 B2
(45) Date of Patent: May 6, 2014

(54) BASE STATION CONFIGURATION DESIGN SUPPORT SYSTEM, AND BASE STATION CONFIGURATION DESIGN SUPPORT METHOD AND PROGRAM

(75) Inventor: Masahiro Motoyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 211 days.

(21) Appl. No.: 12/920,199

(22) PCT Filed: Mar. 24, 2009

(86) PCT No.: PCT/JP2009/055751
§ 371 (c)(1), (2), (4) Date: Aug. 30, 2010

(87) PCT Pub. No.: WO2009/119545
PCT Pub. Date: Oct. 1, 2009

(65) Prior Publication Data
US 2011/0003596 A1    Jan. 6, 2011

(30) Foreign Application Priority Data
Mar. 24, 2008   (JP) ................................ 2008-076049

(51) Int. Cl.
*H04M 1/00* (2006.01)
*H04B 1/38* (2006.01)

(52) U.S. Cl.
USPC ........... 455/561; 455/461; 455/446; 455/418; 455/419; 455/423

(58) Field of Classification Search
USPC .......................... 455/446, 561, 418, 419, 423
See application file for complete search history.

(56) References Cited

U.S. PATENT DOCUMENTS

| | | | |
|---|---|---|---|
| 8,019,352 B2* | 9/2011 | Rappaport et al. | 455/456.1 |
| 2001/0036824 A1* | 11/2001 | Hamabe | 455/422 |
| 2004/0127224 A1* | 7/2004 | Furukawa et al. | 455/446 |
| 2005/0288009 A1* | 12/2005 | Poletti | 455/423 |
| 2006/0141998 A1* | 6/2006 | Kennedy et al. | 455/423 |
| 2006/0160535 A1* | 7/2006 | Snyder et al. | 455/424 |
| 2008/0004035 A1* | 1/2008 | Atkins et al. | 455/454 |

FOREIGN PATENT DOCUMENTS

| | | |
|---|---|---|
| JP | 2001285923 A | 10/2001 |
| JP | 2001313971 A | 11/2001 |
| JP | 2003274444 A | 9/2003 |
| JP | 2004201269 A | 7/2004 |

OTHER PUBLICATIONS

International Search Report for PCT/JP2009/055751 mailed May 26, 2009.

* cited by examiner

*Primary Examiner* — Kwasi Karikari
(74) *Attorney, Agent, or Firm* — Sughrue Mion, PLLC

(57) ABSTRACT

A base station configuration design support system for a mobile communication system includes an estimation unit that estimates a radio wave propagation characteristic with respect to a large number of station position candidate points, with a spot at which there is a need to improve radio wave quality (countermeasure target spot) as a transmitting point, and an extraction unit extracts an improvable station position candidate point where radio wave quality at the countermeasure target spot can be improved, from among a plurality of station position candidate points, in response to an estimation result obtained by the estimation unit.

28 Claims, 11 Drawing Sheets

BASE STATION CONFIGURATION DESIGN SUPPORT SYSTEM, AND BASE STATION CONFIGURATION DESIGN SUPPORT METHOD AND PROGRAM

REFERENCE TO RELATED APPLICATION

The present invention is the National Phase of PCT/JP2009/055751, filed Mar. 24, 2009, which is based upon and claims the benefit of the priority of Japanese Patent Application No. 2008-076049 (filed on Mar. 24, 2008), the disclosure of which is incorporated herein in its entirety by reference thereto.

TECHNICAL FIELD

The present invention relates to a base station configuration design support system that supports design configuration of a base station for a mobile communication system, and to a base station configuration design support method and program. In particular, when given a countermeasure target spot at which it is desired to improve radio wave quality, the invention relates to a base station configuration design support system for facilitating determination of a configuration position of a base station by extracting, from among a plurality of station position candidate points, a station position candidate point at which radio wave quality at a countermeasure target spot can be improved (improvable station position candidate point), and to a base station configuration design support method and program.

BACKGROUND

In order to efficiently determine the number of base stations and configuration locations in a wireless communication system such as in cellular telephony, configuration design of base stations is performed using a base station configuration design support system that has a radio wave propagation simulation function. In a conventional base station configuration design method using a base station configuration design system, one or a plurality of base stations are configured at base station configuration candidate points in an area that is to be designed, and an estimation is made of a proportion (area coverage ratio) of an area (service area) in which service by a group of the base stations in question is possible, with respect to the entire area that is to be designed. In the same way, an area coverage ratio is evaluated for another base station configuration pattern, and evaluation is repeated until a base station configuration pattern is obtained in which a desired area coverage ratio is achieved. In a case where this type of trial and error optimum configuration search for base station configuration is carried out, there is a problem in that, each time a base station configuration pattern is given, a detailed radio wave propagation characteristic estimation is required, that extends over an entire area to be designed for each base station, and a very large amount of processing time is taken.

Therefore, according to Patent Document 1, a method is disclosed in which, in order that the proportion of area where reception power is greater than or equal to a fixed value at points where quality is evaluated, is greater than or equal to a prescribed value, and to have a minimum number of base stations, optimization is performed using a genetic algorithm.

Furthermore, Patent Document 2 discloses a cell design method in which installation positions of wireless LAN terminals are specified, and based on a specification of the wireless LAN terminals and wireless base stations, the position and number of the wireless base stations for covering the specified wireless LAN terminals are calculated.

[Patent Document 1] JP Patent Kokai Publication No. JP-P2001-285923A
[Patent Document 2] JP Patent Kokai Publication No. JP-P2003-274444A

SUMMARY

The entire disclosures of the abovementioned Patent Documents 1 and 2 are incorporated herein by reference thereto. The following analysis is given from a viewpoint of the present invention. In order to improve radio wave quality of, in addition to where a service area is newly expanded, places where there has been a report of a demand for improved quality from users of a service in a wireless communication system, or places that are highly public and the like (countermeasure target spots), investigation may be made of places where a new base station is installed, using a base station configuration design system.

Furthermore, in a case where there is an area of quality deterioration in the surroundings, separate from the abovementioned countermeasure target spots, there is a demand to improve this area also as much as possible. In particular, where the number of station position candidate points is large, it is conceivable that among all the station position candidate points, there will be a mix of station position candidate points for which radio wave quality at a countermeasure target spot can be improved (improvable station position candidate points), with position candidate points for which this does not apply.

In such a case, in order to investigate installation places for a new base station, technology is required for efficiently extracting improvable station position candidate points, using high accuracy radio wave propagation simulation. However, the abovementioned conventional technology has not been able to satisfy this requirement. A description is given below of problem points of the conventional technology.

In a case where the conventional trial and error optimum configuration search for base station configuration is carried out, there is a need to repeat simulation with regard to the entire area that is to be designed for each base station configuration candidate point as described above, and thus a very large amount of processing time is taken.

On the other hand, since station position candidate points for which radio wave quality at a countermeasure target spot cannot be improved do not satisfy required design conditions, the station position candidates are excluded at this point in time. Therefore, simulation results of spots outside of the countermeasure target spots are not utilized. As a result, this can be considered as performing wasted calculation.

Furthermore, a method of Patent Document 1 is effective in a normal case where coverage of an entire service area is an evaluation parameter for optimization, but there is little effect in the above described case where only limited points thereamong form evaluation parameters. Therefore, it is difficult to effectively extract an improvable station position candidate point.

In addition, in a method of Patent Document 2, a configuration layout is obtained for wireless base stations that can provide coverage with fewer units under a condition that configuration of terminals be approximately decided. Furthermore, in the method described in the same publication, with a wireless base station as a transmitting point and a wireless LAN terminal as a reception point, a judgment is made as to whether or not all wireless LAN terminals within a circle having a wireless base station as center are covered, while increasing the number of wireless base station installations. As a result, in a case where it is desired to obtain a better position from among installation position candidates (station position candidate points) of a large number of wireless base stations, there is much waste and this method certainly cannot be said to be efficient.

The present invention was made in light of the abovementioned situation, and it is an object thereof to provide a base station configuration design support system in which, when a countermeasure target spot at which it is desired to improve radio wave quality is given, a station position candidate point for which radio wave quality at a countermeasure target spot can be improved (improvable station position candidate point) can be efficiently extracted, and to provide a base station configuration design support method and program.

According to a first aspect of the present invention there is provided a base station configuration design support system for a mobile communication system as follows. The base station configuration design support system includes an estimation unit that estimates a radio wave propagation characteristic with respect to a plurality of station position candidate points, with a spot at which there is a need to improve radio wave quality (countermeasure target spot) of the mobile communication system as a transmitting point; and an extraction unit that extracts an improvable station position candidate point where radio wave quality at the countermeasure target spot can be improved, from among the plurality of station position candidate points, in response to an estimation result obtained by the estimation unit.

According to a second aspect of the present invention, there is provided a base station configuration design support method for a mobile communication system using a computer, the method including an estimating step of estimating a radio wave propagation characteristic with respect to a plurality of station position candidate points, with a spot at which there is a need to improve radio wave quality (countermeasure target spot) as a transmitting point, and an extracting step of extracting an improvable station position candidate point where radio wave quality at the countermeasure target spot can be improved, from among the plurality of station position candidate points, in response to an estimation result obtained by the estimation unit. Incidentally, this method invention was tied to a particular apparatus such as the base station configuration design support system of the first aspect.

According to a third aspect of the present invention, there is provided a program (computer readable program) that executes on a computer system forming a base station configuration design support system for a mobile communication system, the program executing on the computer an estimating process of estimating a radio wave propagation characteristic with respect to a plurality of station position candidate points, with a spot at which there is a need to improve radio wave quality (countermeasure target spot) as a transmitting point, and an extracting process of extracting an improvable station position candidate point where radio wave quality at the countermeasure target spot can be improved, from among the plurality of station position candidate points, in response to an estimation result obtained by the estimation means. It is to be noted that this program can be recorded on a storage medium that is computer readable.

The meritorious effects of the present invention are summarized as follows. According to the present invention it is possible to efficiently select a station position candidate point to be chosen from a plurality of station position candidate points. A reason for this is that a configuration is adopted in which, even if positions of a transmitting point and a reception point are switched, by using reversibility of radio wave propagation in which a radio wave propagation characteristic does not change, with a countermeasure target spot at which it is desired to improve radio wave quality as a transmitting point, the radio wave propagation characteristic is estimated, and a station position candidate point is extracted at which it is possible to improve the radio wave quality from among the plurality of station position candidate points.

As for the explanation of symbols, refer to the end of the specification.

PREFERRED MODES

Next, a detailed description is given concerning preferable exemplary embodiments of the present invention, making reference to the drawings.

First Exemplary Embodiment

Figure 1:
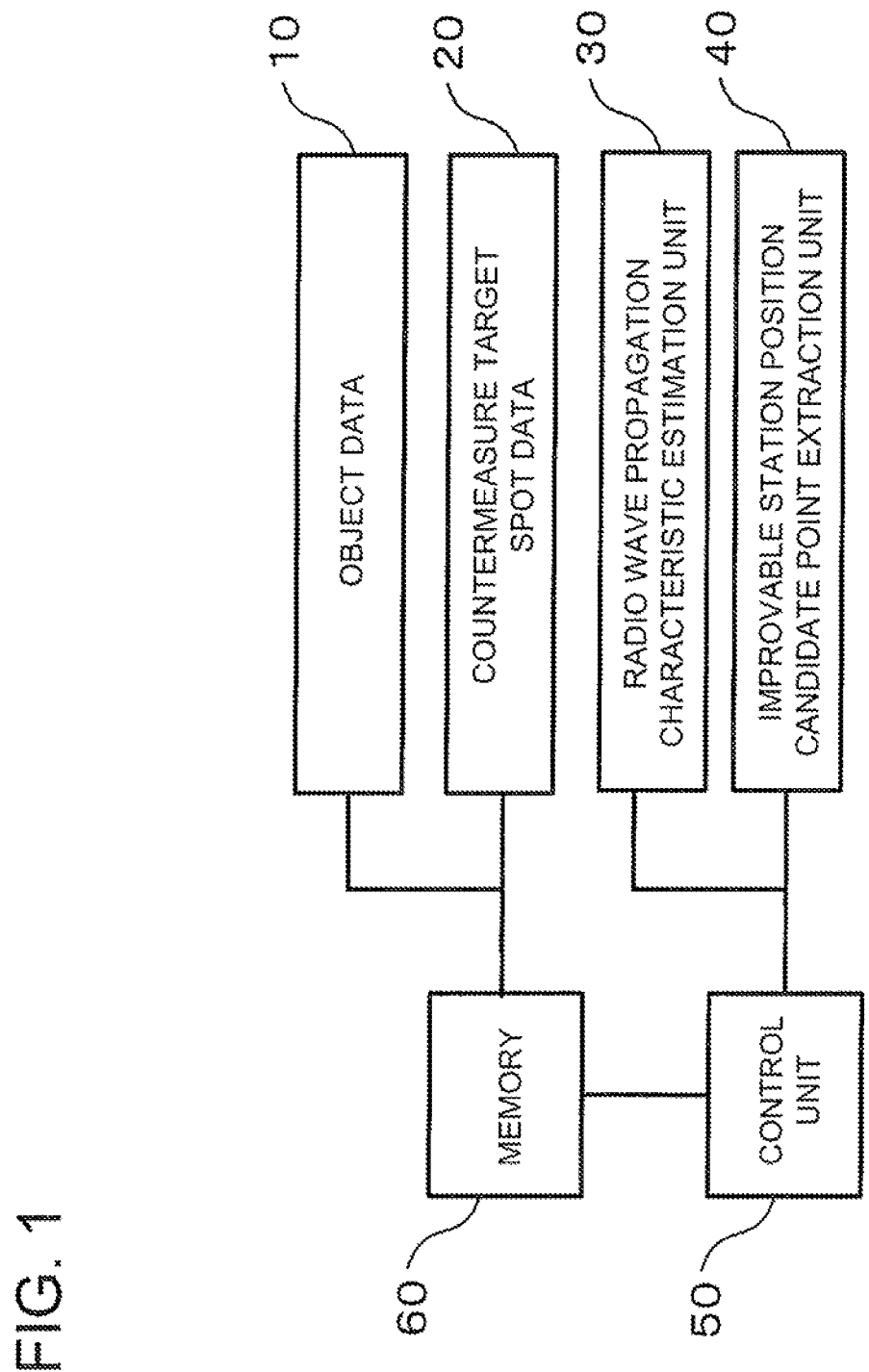
FIG. 1 is a functional block diagram of a base station configuration design support system of a first exemplary embodiment of the present invention.

FIG. 1 is a functional block diagram of a base station configuration design support system of a first exemplary embodiment of the present invention. Referring to FIG. 1, the base station configuration design support system in the first exemplary embodiment of the present invention is configured to include a memory 60 that stores object data 10 and countermeasure target spot data 20, and a control unit 50 that functions as a radio wave propagation characteristic estimation unit (estimation unit) 30 and an improvable station position candidate point extraction unit (extraction unit) 40.

The object data 10 is data containing coordinate data showing position and shape of indoor and outdoor structural items (objects) such as buildings and indoor equipment.

The countermeasure target spot data 20 is coordinate data of spots where there is a need to improve radio wave quality, such as places where there has been a report of a demand for improved quality from users of a service in a wireless communication system, or places that are highly public.

The radio wave propagation characteristic estimation unit 30 has a function of estimating a propagation characteristic of a radio wave in an area that is to be designed, with a countermeasure target spot shown in the countermeasure target spot data 20 as a base point.

The improvable station position candidate point extraction unit 40 has a function of extracting a station position candidate point (improvable station position candidate point) where radio wave quality of a countermeasure target spot can be improved in response to an estimation result obtained from the radio wave propagation characteristic estimation unit 30.

The control unit 50 operates by a computer program, and is a CPU that functions as the radio wave propagation characteristic estimation unit (estimation unit) 30 and the improvable station position candidate point extraction unit (extraction unit) 40.

The memory 60 is realized by various types of storage device which, in addition to storing the object data 10, the countermeasure target spot data 20, and a program that makes the control unit 50 execute, also functions as an operating memory of the control unit 50.

Figure 2:
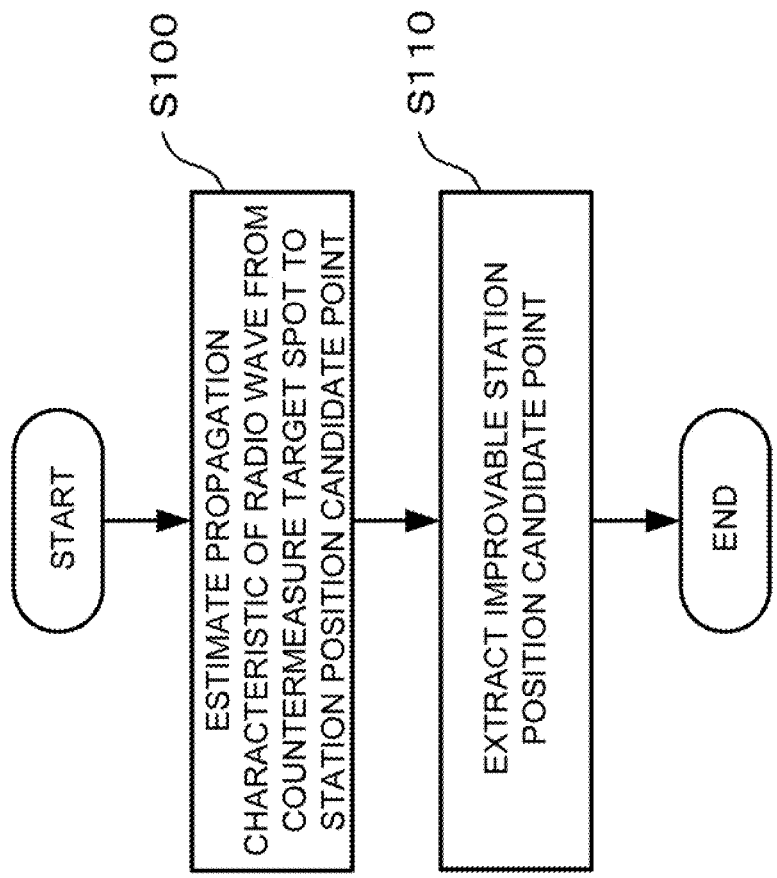
FIG. 2 is a flow chart representing operation of the base station configuration design support system of the first exemplary embodiment of the present invention.

FIG. 2 is a flow chart representing operation of the base station configuration design support system of the first exemplary embodiment. First, the radio wave propagation characteristic estimation unit 30 performs setting of a station position candidate point using the object data 10.

Figure 3:
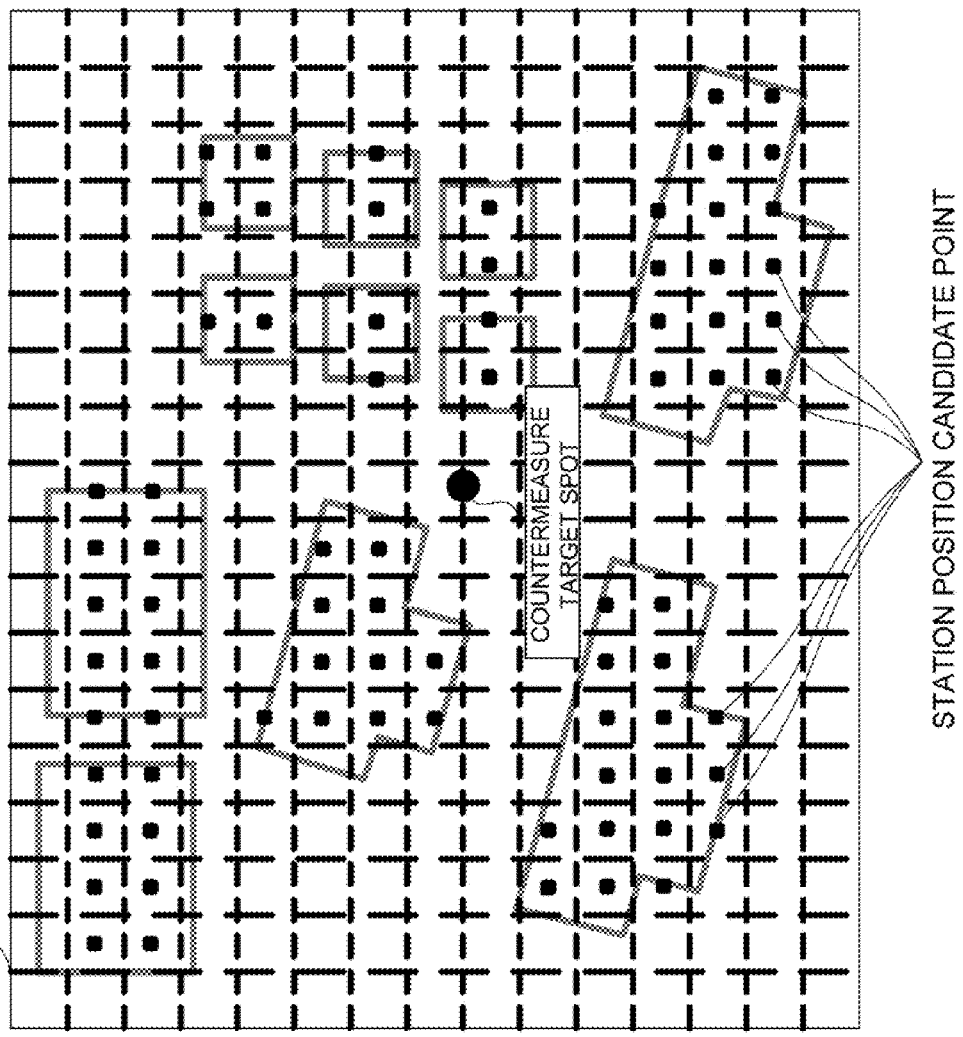
FIG. 3 is a diagram for describing one example of a method of setting a station position candidate point.

Specifically, as shown in FIG. 3, an area that is to be designed is divided into a grid, and in a case where a center point of this grid is on a building, this center point is taken as a station position candidate point. Or, the center of a building present within the area that is to be designed is possible. In either case, the height of the station position candidate point from the ground is a value obtained by adding building height and the height of an antenna used.

Figure 4:
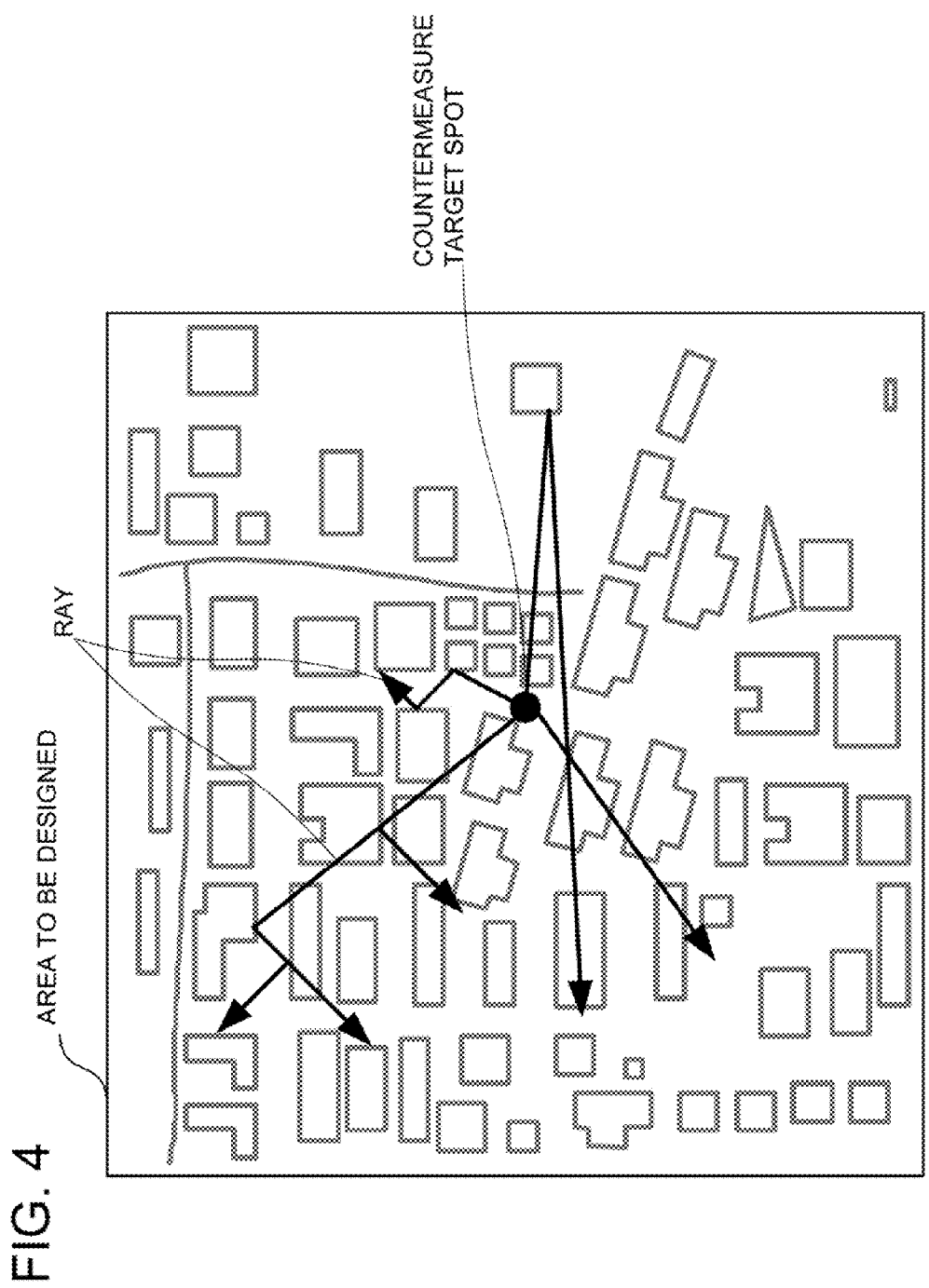
FIG. 4 is a diagram for describing an example (ray launching) of a method of estimating a propagation characteristic of a radio wave from a countermeasure target spot to a station position candidate point.

As shown in FIG. 4, the radio wave propagation characteristic estimation unit 30 estimates a propagation characteristic of a radio wave from a specific countermeasure target spot included in the countermeasure target spot data 20 to a station position candidate point (step S100 in FIG. 2).

The example of FIG. 4 illustrates a case where a ray launching method is used as the radio wave propagation estimation method, but other methods can also be used. For example, a statistical path loss model or the like, which gives consideration to average building height in a propagation path, can be applied.

Next, the improvable station position candidate point extraction unit 40 extracts improvable station position candidate points from among a plurality of station position candidate points, in response to an estimation result obtained in step S100 (step S110 in FIG. 2).

A description is given concerning the improvable station position candidate point extraction method in step S110. First, the improvable station position candidate point extraction unit 40 evaluates the radio wave quality at the station position candidate points in question. The radio wave propagation characteristic in a space normally possesses reversibility when a transmitter and a receiver are exchanged. Using this property, with regard to a station position candidate point satisfying prescribed radio wave quality, assuming that a base station is positioned there, a judgment is made that it is possible to improve the radio wave quality of a countermeasure target spot, and the station position candidate point is taken as an improvable station position candidate point.

At this time, the improvable station position candidate point extraction unit 40 may add gain due to directionality of an antenna used in a base station, to propagation loss, and evaluate the radio wave quality by using propagation loss to which gain has been added. For example, in a case where extraction is preferable, which includes a radio wave only when in a certain limited azimuth range, as far as an improvable station position candidate point, among azimuths that can be set, an azimuth where gain corresponding to a direction of a countermeasure target spot from the station position candidate point in question has a maximum value, is an azimuth of an antenna at the station position candidate point in question.

On the other hand, not depending on azimuth, a case can be considered in which it is preferable to extract only station position candidate points where the radio wave quality can be improved. In this case, the improvable station position candidate point extraction unit 40 takes an azimuth with a minimum value of gain corresponding to a direction of a countermeasure target spot from the station position candidate point in question, among azimuths of an antenna that can be set; to be an azimuth of the antenna at the station position candidate point in question.

If this is performed more strictly, it is possible to evaluate the radio wave quality for each azimuth that can be set, and to have only station position candidate points that satisfy prescribed radio wave quality at all azimuths, as the improvable station position candidate points. By implementing processing thereof for each station position candidate point, improvable station position candidate points are extracted.

In the present exemplary embodiment as described above, in step S100, an estimation is made of the propagation characteristic of a radio wave from a countermeasure target spot corresponding to a receiving side to a station position candidate point corresponding to a transmitting side, which is a direction opposite to a conventional radio wave propagation estimation method. As a result, in the conventional method it is necessary to repeat simulations according to the number of station position candidate points, but since it is possible to reduce this to one, as a result it is possible to greatly reduce processing time.

Second Exemplary Embodiment

Next, a detailed description is given concerning a second exemplary embodiment of the present invention, making reference to the drawings.

Figure 5:
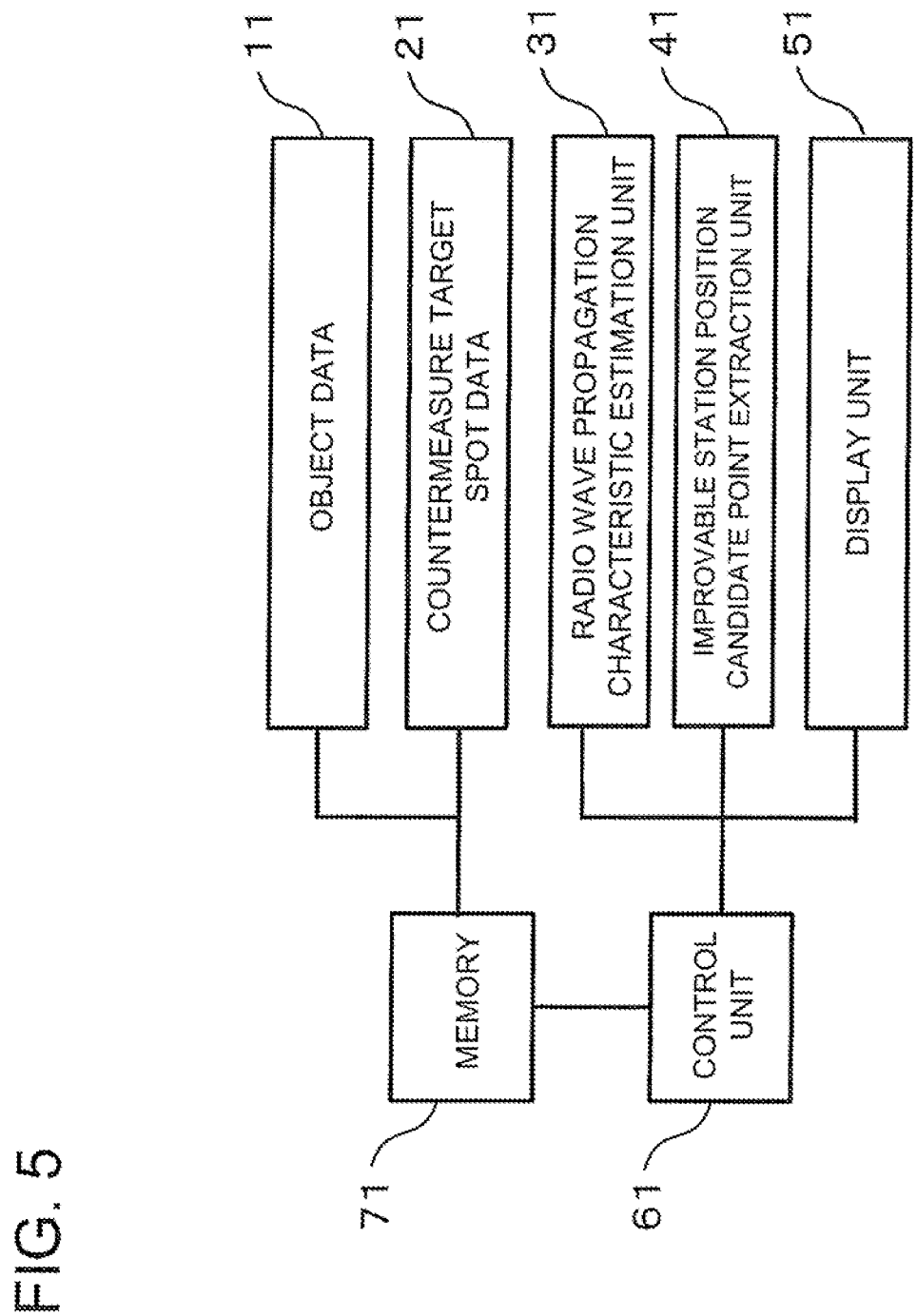
FIG. 5 is a functional block diagram of a base station configuration design support system of a second exemplary embodiment of the present invention.

FIG. 5 is a functional block diagram of a base station configuration design support system of the second exemplary embodiment of the present invention. Referring to FIG. 5, in the base station configuration design support system of the second exemplary embodiment of the present invention a display unit 51 is added to a configuration of the first exemplary embodiment. From object data 11 as far as an improvable station position candidate point extraction unit 41, and a control unit 61 and a memory 71, in FIG. 5, are similar to the object data 10 as far as the improvable station position candidate point extraction unit 40, and the control unit 50 and the memory 60 of the first exemplary embodiment of the present invention, and thus descriptions are omitted.

The display unit 51 has a function of highlighting and displaying improvable station position candidate points.

Figure 6:
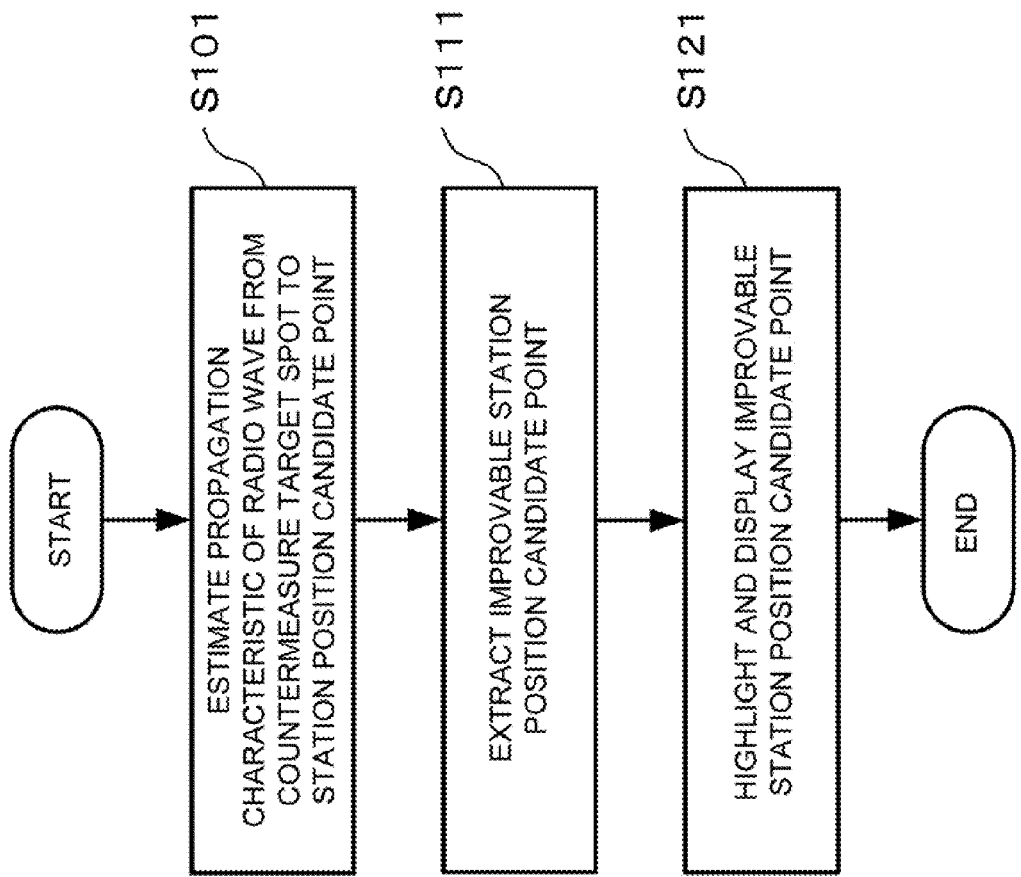
FIG. 6 is a flow chart representing operation of the base station configuration design support system of the second exemplary embodiment of the present invention.

FIG. 6 is a flow chart representing operation of the base station configuration design support system of the second exemplary embodiment of the present invention. First, a radio wave propagation characteristic estimation unit 31 uses a method the same as in the first exemplary embodiment and after setting a station position candidate point, estimates a propagation characteristic of a radio wave from a specific countermeasure target spot to a station position candidate point (step S101 in FIG. 6).

Next, the improvable station position candidate point extraction unit 41 uses a method the same as in the first exemplary embodiment to extract an improvable station position candidate point (step S111 in FIG. 6).

Next, the display unit 51 highlights and displays the improvable station position candidate points obtained in step S111 (step S121 in FIG. 6).

A description is given concerning a specific display method in step S121. For example, the display unit 51 can use a method applying colors to a grid including the improvable station position candidate points.

Figure 7:
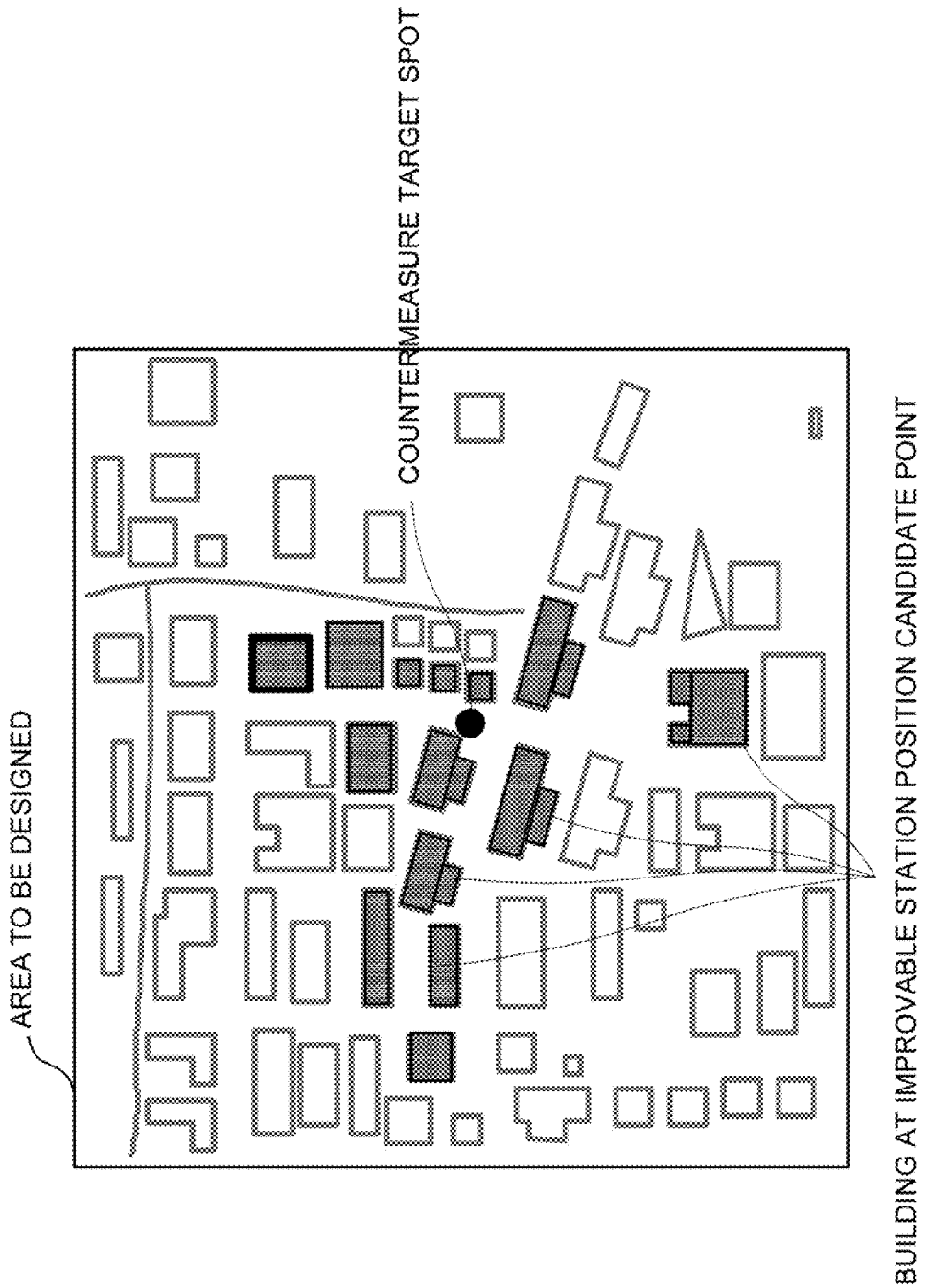
FIG. 7 is a drawing for describing a highlighted display example (pattern added) of improvable station position candidate points of the base station configuration design support system of the second exemplary embodiment of the present invention.

Furthermore, the display unit 51 can use a method causing a grid including the improvable station position candidate points or the improvable station position candidate points to blink. Or, as shown in FIG. 7, the display 51 can use a method of displaying by applying a pattern to an entire building on the improvable station position candidate points.

According to the second exemplary embodiment that highlights and displays the improvable station position candidate points as above, it is possible for a designer to clearly recognize the improvable station position candidate points.

Third Exemplary Embodiment

Next, a detailed description is given concerning a third exemplary embodiment of the present invention, making reference to the drawings. In the third exemplary embodiment of the present invention it is possible to realize a configuration similar to the second exemplary embodiment described above (refer to FIG. 5). Furthermore, with regard to operation, since a specific improvable station position candidate point extraction method in step S111 and a specific display method in step S121, in a flowchart of FIG. 6, only differ from the second exemplary embodiment of the present invention as described above, these points of difference are described below using FIG. 5 and FIG. 6.

In the abovementioned second exemplary embodiment, the improvable station position candidate point extraction unit 41 takes a station position candidate point that satisfies a prescribed radio wave quality as an improvable station position candidate point for which radio wave quality of a countermeasure target spot can be improved.

However, even with a station position candidate point that does not satisfy the prescribed radio wave quality, by adopting a strategy such as changing an azimuth of an antenna, or changing an antenna that is scheduled to be used to one having stronger gain, it may be possible to satisfy the specific radio wave quality.

Consequently, in step S111 in the present exemplary embodiment, the improvable station position candidate point extraction unit 41 determines a station position candidate point that satisfies a second radio wave quality (set in advance) having a value lower than a prescribed radio wave quality (a first radio wave quality), and takes the station position candidate point as an improvable station position candidate point.

In step S121, a display unit 51 highlights and displays the improvable station position candidate point, and also displays a value obtained by subtracting the first radio wave quality from the radio wave quality of the station position candidate point in question, in the vicinity of the improvable station position candidate point.

Figure 8:
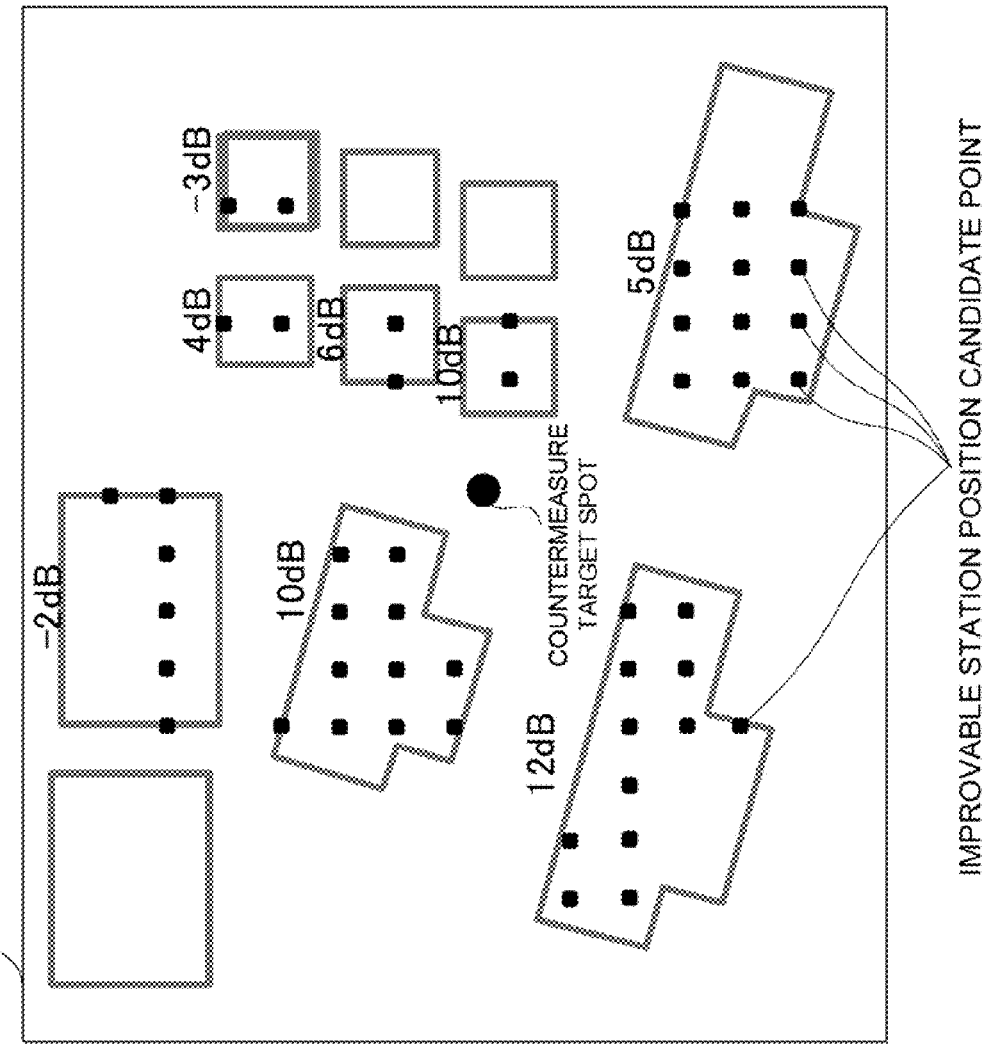
FIG. 8 is a drawing for describing a highlighted display example (display of radio wave quality average value vicinity on buildings) of improvable station position candidate points of a base station configuration design support system of a third exemplary embodiment of the present invention.

However, in a case where an interval between station position candidate points is narrow and it is not suitable to display the abovementioned value for each station position candidate point, it is preferable to display an average value for improvable station position candidate points on the same building as shown in FIG. 8, in the vicinity of the building in question.

In step S111, in the third exemplary embodiment as described above, the improvable station position candidate point extraction unit 41 decides the second radio wave quality having a value lower than the prescribed radio wave quality (first radio wave quality), determines a station position candidate point that satisfies the second radio wave quality, and takes the station position candidate point as an improvable station position candidate point. In step S121 that follows, the display unit 51 displays a value obtained by subtracting the first radio wave quality from the radio wave quality of the station position candidate point in question, in the vicinity of the improvable station position candidate point.

As a result, the first radio wave quality is not satisfied, but by taking a strategy of changing an antenna or the like, since it is possible to include and extract a countermeasure target spot as far as an improvable station position candidate point, it is possible to realize a more flexible design.

Fourth Exemplary Embodiment

Continuing, a detailed description is given concerning a fourth exemplary embodiment of the present invention, in which it is possible to improve the radio wave quality of a plurality of countermeasure target spots at the same time, making reference to the drawings. In the fourth exemplary embodiment of the present invention it is possible to realize a configuration similar to the second exemplary embodiment described above (refer to FIG. 5). A description is given below of points of difference with regard to operation thereof, using FIG. 9.

Figure 9:
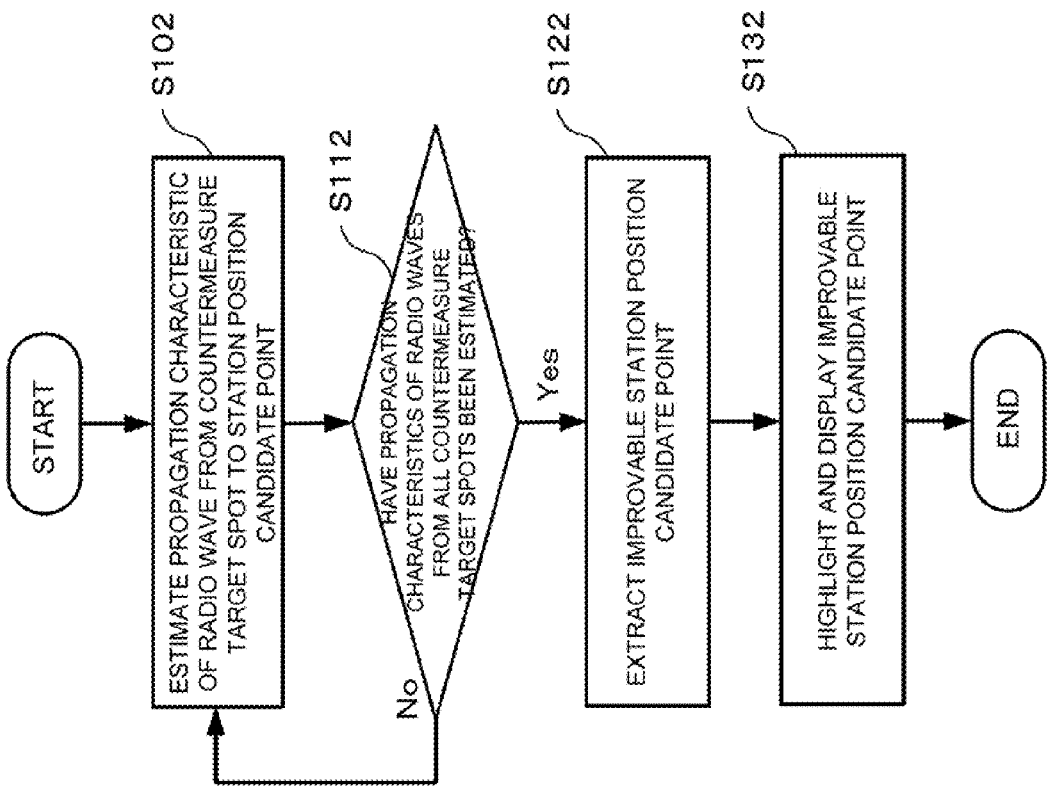
FIG. 9 is a flow chart representing operation of a base station configuration design support system of a fourth exemplary embodiment of the present invention.

FIG. 9 is a flow chart representing operation of a base station configuration design support system in the fourth exemplary embodiment of the present invention. First, a radio wave propagation characteristic estimation unit 31 uses a method the same as in the second exemplary embodiment and after setting a station position candidate point, estimates a propagation characteristic of a radio wave from a specific countermeasure target spot to a station position candidate point (step S102).

Continuing, the radio wave propagation characteristic estimation unit 31, in the same way with regard to second and subsequent countermeasure target spots, executes an estimation process of step S102 for each thereof (step S112).

When estimation of the propagation characteristic of a radio wave from all the countermeasure target spots is completed (Yes in step S112), the improvable station position candidate point extraction unit 41 uses a method the same as in step S111 of the second exemplary embodiment to extract an improvable station position candidate point for each countermeasure target spot (step S122).

Next, the display unit 51 highlights and displays the improvable station position candidate point obtained in step S122 (step S132). At this time, in a case where there is one new base station that can be configured, the display unit 51 highlights and displays only a station position candidate point for which the radio wave quality of all countermeasure target spots can be improved, as an improvable station position candidate point.

On the other hand, in a case where there are plural new base stations that can be configured, the display unit 51 provides a display for grasping the extent of improvement with regard to all the countermeasure target spots for each improvable station position candidate point.

Figure 10:
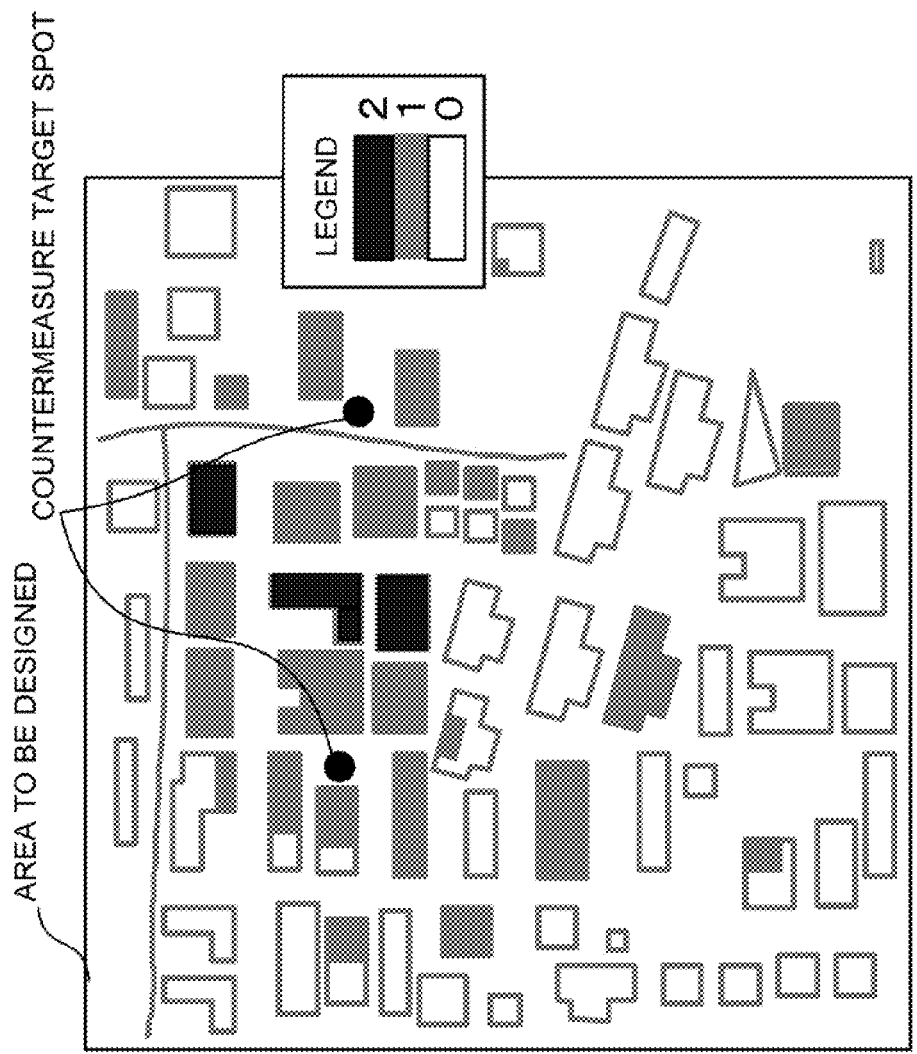
FIG. 10 is a drawing for describing a highlighted display example (tone distinguished according to the number of countermeasure target spots where quality can be improved) of improvable station position candidate points of the base station configuration design support system of the fourth exemplary embodiment of the present invention.

For example, as shown in FIG. 10, it is possible to preferably use a method of displaying a station position candidate point for which it is possible to improve the radio wave quality of any one countermeasure target spot, by color differentiation for each improvable countermeasure target spot.

Figure 11:
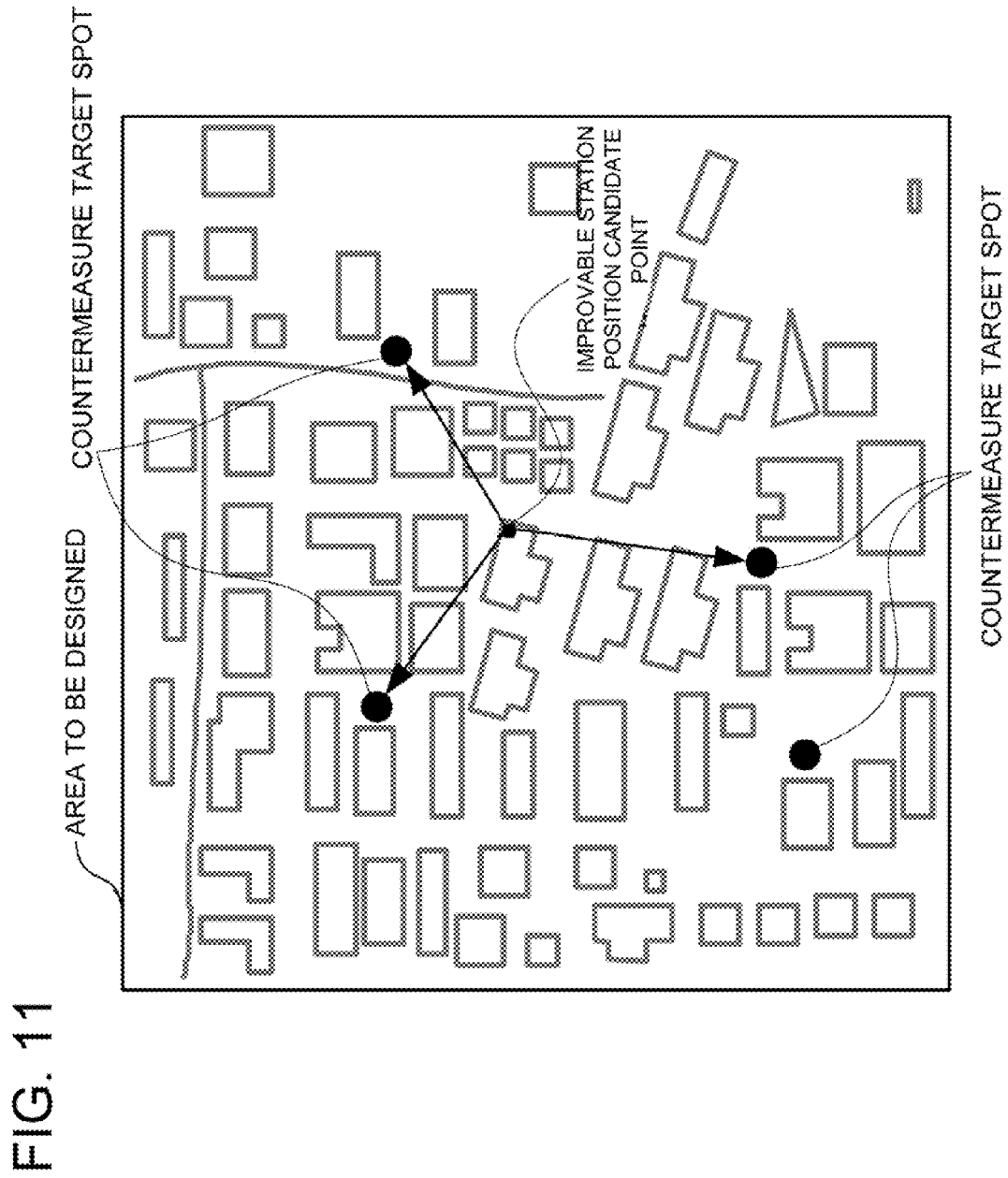
FIG. 11 is a drawing for describing a highlighted display example (display of corresponding relationships of countermeasure target spots where quality can be improved) of improvable station position candidate points of the base station configuration design support system of the fourth exemplary embodiment of the present invention.

Or, in order to represent corresponding relationships of a specific station position candidate point and a plurality of countermeasure target spots in an easily understood way, as shown in FIG. 11, a display may be made by connecting a line between a specific station-position candidate point and a countermeasure target spot for which radio wave quality can be improved by configuring a base station at the station position candidate point.

In the present exemplary embodiment, in step S132, in a case where there are plural new base stations that can be configured, a display is made in order to grasping the extent of improvement with regard to all the countermeasure target spots for each improvable station position candidate point. As a result, even in a case where there is a plurality of both countermeasure target spots and new base stations that can be configured, it is possible to easily determine a base station configuration position.

Descriptions have been given above of preferable exemplary embodiments of the present invention, but the present invention is not limited to the abovementioned exemplary embodiments, and further modifications, substitutions, and adjustments can be added within bounds that do not depart from fundamental technological concepts of the present invention.

INDUSTRIAL APPLICABILITY

The present invention can be applied to uses such as station position design for mobile communication. In particular, in a case where improvement of radio wave quality at a countermeasure target spot is a necessary design condition, this necessary condition can be satisfied so that it is possible to efficiently implement a design task.

It is to be noted that each disclosure of the abovementioned patent documents and the like are incorporated herein by reference. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the art can realize according to technological concepts and the entire disclosure including the scope of the claims.

EXPLANATION OF SYMBOLS

10 object data
20 countermeasure target spot data
30 radio wave propagation characteristic estimation means
40 improvable station position candidate point extraction means
50 control unit
60 memory
11 object data
21 countermeasure target spot data
31 radio wave propagation characteristic estimation means
41 improvable station position candidate point extraction means
51 display means
61 control unit
71 memory

What is claimed is:

1. A base station configuration design support system characterized by comprising:
    an estimation unit that estimates a radio wave propagation characteristic with respect to a plurality of station position candidate points in an area that is to be designed, with a spot at which there is a need to improve radio wave quality (countermeasure target spot) in the area that is to be designed of a mobile communication system as a transmitting point; and
    an extraction unit that extracts an improvable station position candidate point where radio wave quality at said countermeasure target spot can be improved, from among said plurality of station position candidate points, in response to an estimation result obtained by said estimation unit,
    wherein said area that is to be designed is divided into a grid, and in a case where a center point of this grid is on a building, this center point is taken as a station position candidate point.

2. The base station configuration design support system according to claim 1, wherein, in said extraction unit, radio wave quality at said station position candidate point is evaluated using an estimation result obtained by said estimation unit, and in a case where said radio wave quality at said station position candidate point satisfies said prescribed radio wave quality, said station position candidate point is made said improvable station position candidate point.

3. The base station configuration design support system according to claim 1, wherein said extraction unit adds gain due to directionality of an antenna to an estimation result obtained by said estimation unit, to evaluate radio wave quality.

4. The base station configuration design support system according to claim 3, wherein, when gain due to directionality of said antenna is added, said extraction unit employs an azimuth where gain corresponding to a direction of a countermeasure target spot from said station position candidate point, is largest, among azimuths of antennas that can be installed with regard to said station position candidate point.

5. The base station configuration design support system according to claim 3, wherein, when gain due to said directionality of said antenna is added, said extraction unit employs an azimuth where gain corresponding to a direction of a countermeasure target spot from said station position candidate point, is smallest, among azimuths of antennas that can be installed with regard to said station position candidate point.

6. The base station configuration design support system according to claim 3, wherein said extraction unit evaluates radio wave quality for each azimuth of an antenna that can be installed with regard to said station position candidate point, and extracts only said station position candidate point that satisfies a specific radio wave quality at all azimuths, as said improvable station position candidate point.

7. The base station configuration design support system according to claim 1, wherein, in a case where a plurality of said countermeasure target spots are present, said estimation unit estimates a radio wave propagation characteristic for each of said countermeasure target spots, and said extraction unit extracts said improvable station position candidate point for each of said countermeasure target spots.

8. The base station configuration design support system according to claim 7, wherein plural countermeasure target spots and an improvable station position candidate point for which radio wave quality of all of said plural countermeasure target spots can be improved, are highlighted and displayed, on a prescribed map.

9. The base station configuration design support system according to claim 7, characterized in that said improvable station position candidate point is color-differentiated and displayed on a prescribed map, according to the number of said countermeasure target spots for which radio wave quality can be improved.

10. The base station configuration design support system according to claim 7, wherein an improvable station position candidate point and a countermeasure target spot for which radio wave quality of said improvable station position candidate point can be improved, are associated to be displayed.

11. The base station configuration design support system according to claim 1, wherein said improvable station position candidate point is highlighted and displayed on a prescribed map.

12. The base station configuration design support system according to claim 1, wherein a second radio wave quality having a value lower than a prescribed radio wave quality (a first radio wave quality) is decided, and with a station position candidate point that satisfies said second radio wave quality as an improvable station position candidate point, a value obtained by subtracting said first radio wave quality from a radio wave quality of said station position candidate point is displayed in an vicinity of an improvable station position candidate point, on a map expressing said improvable station position candidate point.

13. A base station configuration design support system characterized by comprising:
an estimation unit that estimates a radio wave propagation characteristic with respect to a plurality of station position candidate points in an area that is to be designed, with a spot at which there is a need to improve radio wave quality (countermeasure target spot) in the area that is to be designed of a mobile communication system as a transmitting point; and
an extraction unit that extracts an improvable station position candidate point where radio wave quality at said countermeasure target spot can be improved, from among said plurality of station position candidate points, in response to an estimation result obtained by said estimation unit,
wherein the height of said station position candidate point from the ground is a value obtained by adding building height and the height of an antenna used.

14. The base station configuration design support system according to claim 13, wherein, in said extraction unit, radio wave quality at said station position candidate point is evaluated using an estimation result obtained by said estimation unit, and in a case where said radio wave quality at said station position candidate point satisfies said prescribed radio wave quality, said station position candidate point is made said improvable station position candidate point.

15. The base station configuration design support system according to claim 13, wherein said extraction unit adds gain due to directionality of an antenna to an estimation result obtained by said estimation unit, to evaluate radio wave quality.

16. The base station configuration design support system according to claim 15, wherein, when gain due to directionality of said antenna is added, said extraction unit employs an azimuth where gain corresponding to a direction of a countermeasure target spot from said station position candidate point, is largest, among azimuths of antennas that can be installed with regard to said station position candidate point.

17. The base station configuration design support system according to claim 15, wherein, when gain due to said directionality of said antenna is added, said extraction unit employs an azimuth where gain corresponding to a direction of a countermeasure target spot from said station position candidate point, is smallest, among azimuths of antennas that can be installed with regard to said station position candidate point.

18. The base station configuration design support system according to claim 15, wherein said extraction unit evaluates radio wave quality for each azimuth of an antenna that can be installed with regard to said station position candidate point, and extracts only said station position candidate point that satisfies a specific radio wave quality at all azimuths, as said improvable station position candidate point.

19. The base station configuration design support system according to claim 13, wherein, in a case where a plurality of said countermeasure target spots are present, said estimation unit estimates a radio wave propagation characteristic for each of said countermeasure target spots, and said extraction unit extracts said improvable station position candidate point for each of said countermeasure target spots.

20. The base station configuration design support system according to claim 19, wherein plural countermeasure target spots and an improvable station position candidate point for which radio wave quality of all of said plural countermeasure target spots can be improved, are highlighted and displayed, on a prescribed map.

21. The base station configuration design support system according to claim 19, characterized in that said improvable station position candidate point is color-differentiated and displayed on a prescribed map, according to the number of said countermeasure target spots for which radio wave quality can be improved.

22. The base station configuration design support system according to claim 19, wherein an improvable station position candidate point and a countermeasure target spot for which radio wave quality of said improvable station position candidate point can be improved, are associated to be displayed.

23. The base station configuration design support system according to claim 13, wherein said improvable station position candidate point is highlighted and displayed on a prescribed map.

24. The base station configuration design support system according to claim 13, wherein a second radio wave quality having a value lower than a prescribed radio wave quality (a first radio wave quality) is decided, and with a station position candidate point that satisfies said second radio wave quality as an improvable station position candidate point, a value obtained by subtracting said first radio wave quality from a radio wave quality of said station position candidate point is displayed in an vicinity of an improvable station position candidate point, on a map expressing said improvable station position candidate point.

25. A base station configuration design support method for a mobile communication system using a computer, said method comprising:
- an estimating step of estimating a radio wave propagation characteristic with respect to a plurality of station position candidate points, with a spot at which there is a need to improve radio wave quality (countermeasure target spot) as a transmitting point; and
- an extracting step of extracting an improvable station position candidate point where radio wave quality at said countermeasure target spot can be improved, from among said plurality of station position candidate points, in response to an estimation result obtained by said estimation unit,
- wherein said area that is to be designed is divided into a grid, and in a case where a center point of this grid is on a building, this center point is taken as a station position candidate point.

26. A non-transitory computer-readable storage medium storing a program that executes on a computer forming a base station configuration design support system for a mobile communication system, said program executing on said computer:
- an estimating process of estimating a radio wave propagation characteristic with respect to a plurality of station position candidate points, with a spot at which there is a need to improve radio wave quality (countermeasure target spot) as a transmitting point; and
- an extracting process of extracting an improvable station position candidate point where radio wave quality at said countermeasure target spot can be improved, from among said plurality of station position candidate points, in response to an estimation result obtained by said estimation unit,
- wherein said area that is to be designed is divided into a grid, and in a case where a center point of this grid is on a building, this center point is taken as a station position candidate point.

27. A base station configuration design support method for a mobile communication system using a computer, said method comprising:
- an estimating step of estimating a radio wave propagation characteristic with respect to a plurality of station position candidate points, with a spot at which there is a need to improve radio wave quality (countermeasure target spot) as a transmitting point; and
- an extracting step of extracting an improvable station position candidate point where radio wave quality at said countermeasure target spot can be improved, from among said plurality of station position candidate points, in response to an estimation result obtained by said estimation unit,
- wherein the height of said station position candidate point from the ground is a value obtained by adding building height and the height of an antenna used.

28. A non-transitory computer-readable storage medium storing a program that executes on a computer forming a base station configuration design support system for a mobile communication system, said program executing on said computer:
- an estimating process of estimating a radio wave propagation characteristic with respect to a plurality of station position candidate points, with a spot at which there is a need to improve radio wave quality (countermeasure target spot) as a transmitting point; and
- an extracting process of extracting an improvable station position candidate point where radio wave quality at said countermeasure target spot can be improved, from among said plurality of station position candidate points, in response to an estimation result obtained by said estimation unit,
- wherein the height of said station position candidate point from the ground is a value obtained by adding building height and the height of an antenna used.

\* \* \* \* \*